(No Model.)
E. NAUMANN.
HORSE DETACHER.
No. 570,606. Patented Nov. 3, 1896.
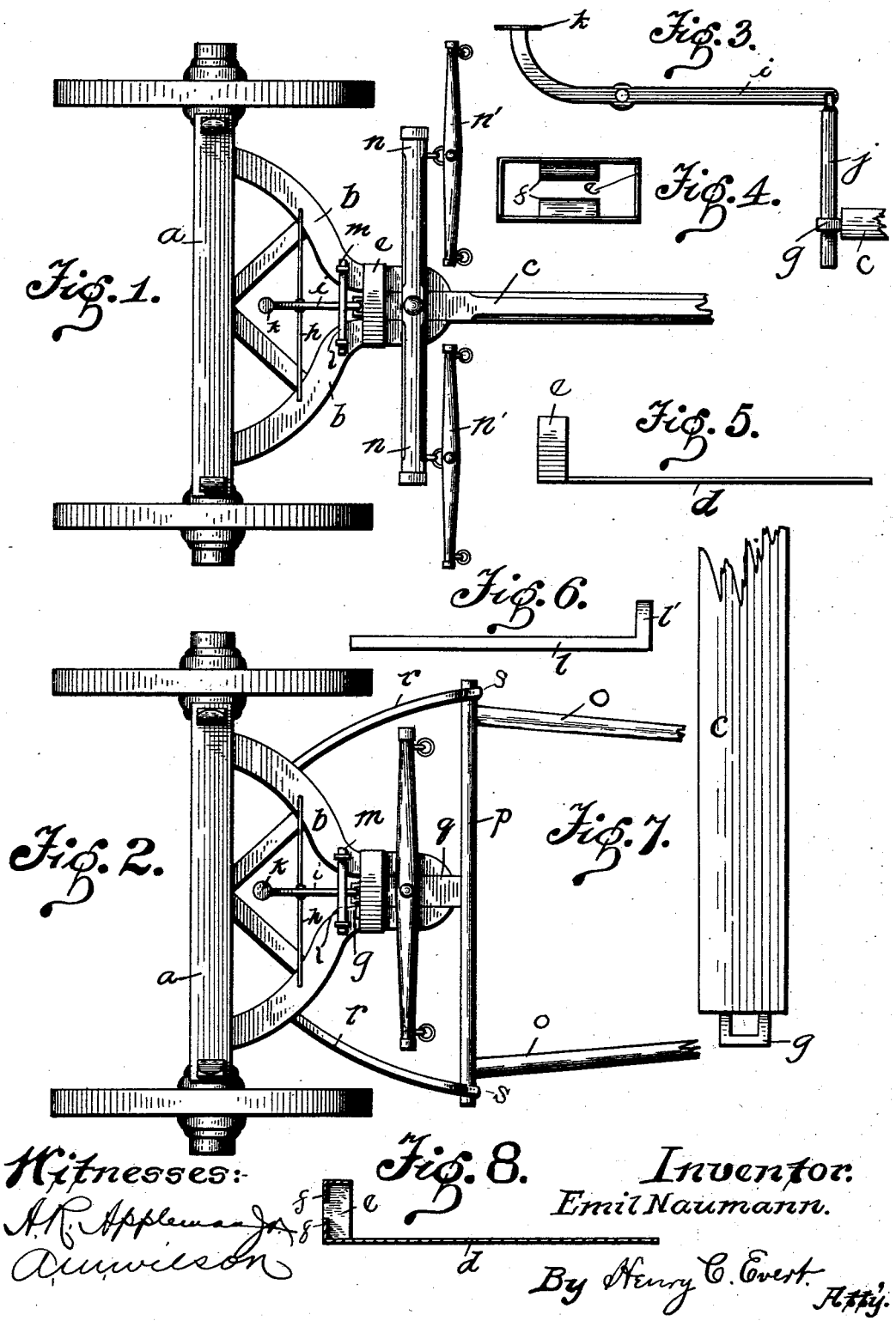
Witnesses:
A. K. Appleman Jr.
A. M. Wilson
Inventor:
Emil Naumann.
By Henry C. Evert. Atty.

UNITED STATES PATENT OFFICE.

EMIL NAUMANN, OF ALTEN ESSEN, GERMANY.

HORSE-DETACHER.

SPECIFICATION forming part of Letters Patent No. 570,606, dated November 3, 1896.

Application filed January 30, 1896. Serial No. 577,451. (No model.)

*To all whom it may concern:*

Be it known that I, EMIL NAUMANN, a subject of the German Emperor, residing at Alten Essen, in the Reg Bez of Dusseldorf and Province of Rhineland, Germany, have invented certain new and useful Improvements in Horse-Detachers, of which the following is a specification, reference being had therein to the accompanying drawings.

The invention relates to certain new and useful improvements in horse-detachers, and has for its object the provision of novel means whereby a runaway horse or horses may be easily and quickly detached from the vehicle, thus avoiding what might be a serious or fatal accident to the occupants of the vehicle.

The invention has for its further object the construction of a device of the above-described class that will be extremely simple in its construction, strong, durable, effectual in its operation, and comparatively inexpensive to manufacture; furthermore, a device that will securely retain the pole or shafts of the vehicle in position until it is desired to release the same.

With the above and other objects in view the invention finally consists in the novel construction, combination, and arrangement of parts to be hereinafter more specifically described, and particularly pointed out in the claims.

In describing the invention in detail reference is had to the accompanying drawings, forming a part of this specification, and wherein like letters of reference indicate similar parts throughout the several views, in which—

Figure 1 is a top plan view of the front truck, showing my improved device attached in position. Fig. 2 is a similar view showing the application of the same to the shafts instead of the pole. Fig. 3 is a side view of the foot-lever and king-bolt. Fig. 4 is an end view of the supporting-plate for the tongue. Fig. 5 is a side view of the same. Fig. 6 is a side view of the retaining-bolt. Fig. 7 is a plan view of a portion of the tongue and eyebolt. Fig. 8 is a sectional view of the supporting-plate and clamp.

In the drawings, $a$ represents the bed-support on the axle, in which are secured the hounds $b\ b$, which may be of the ordinary construction. A plate $d$ is provided carrying on its inner end a band $e$, which encircles the portion of the hounds that engages the tongue $c$. This band $e$ is provided with flanges $f$, which have cut-away portions to permit of inserting the hounds through the band, and the portions of the flanges left intact with the band will serve to prevent the tongue being pushed back through the hounds. In the rear end of this tongue is secured an eyebolt $g$, and a rod $h$, secured to the hounds, carries a foot-lever $i$, provided in its forward end with a king-bolt $j$, adapted to engage in the eyebolt $g$. The rear end of this foot-lever is curved upward, and carries on this end a foot-plate $k$, the lever being held in its normal position by a bolt $l$, having a lug $l'$, said bolt passing over the lever and being retained in position by keepers or staples $m\ m$ in the hounds. The doubletree $n$, carrying the whiffletrees $n'\ n'$, are secured to the tongue by bolt or in any other suitable manner.

In Fig. 2 I have shown the device attached to a vehicle adapted for but one horse. In this application the operation of the device is the same as for the double team, the shafts $o\ o$ being secured to a cross-piece $p$, which is secured to a short pole or tongue engaging in the hounds and carrying the whiffletree and eyebolt. Braces $r\ r$ are secured to the hounds and are provided with forked ends $s\ s$, adapted to engage the cross-piece $p$.

The operation of my improved horse-detacher will be readily apparent.

Presuming that the parts have been secured in their respective positions, as shown, and that a runaway occurs, the driver by reaching down with his foot can readily kick the lug formed on the retaining-bolt, which will knock the bolt from its position, when by a pressure of the foot on the foot-plate $k$ the king-bolt $j$ will be withdrawn from the eyebolt, which will allow the tongue to be withdrawn from the hounds, thus detaching the horses from the vehicle.

It is a well-known fact that many of the most serious of accidents occurring from runaways are occasioned by the vehicle colliding with a telegraph-post, tree, or the like, and thus upsetting the vehicle. By the use of my improved horse-detacher such accidents can be prevented, as the horse or horses are allowed to run when it is seen that the same are beyond control, thus leaving the occupants of the vehicle safe in the same. The retaining-bolt $l$ is formed in a square or flat shape, so as to keep the lug $l'$ of the same always in the upright position ready to withdraw the bolt.

It will be noted that various changes may be made in the details of construction of my improved horse-detacher without departing from the general spirit of my invention.

Having fully described my invention, what I claim as new, and desire to secure by Letters Patent, is—

1. In a horse-detacher, the combination of the foot-lever carrying a plate, a king-bolt connected to the lever, a plate $d$ carrying on its inner end a band, hounds encircled by the band, a tongue, an eye secured in the end of the tongue to engage the king-bolt, and a keeper for the lever, as and for the purpose described.

2. In a horse-detacher, the combination of the foot-lever, a king-bolt connected therewith, a plate $d$, carrying on its inner end a band, a tongue having an eye fitting in an aperture in the end of the plate, said eye receiving the king-bolt, and a lock for holding the lever inoperative, as and for the purpose described.

3. In a horse-detacher, the combination of a foot-lever, a king-bolt connected therewith, a plate carrying on its inner end a band encircling a portion of the hounds, flanges $f$, arranged on the band an eyebolt secured in the end of a tongue, a bolt for holding the lever, and apertured lugs to receive the bolt, as and for the purpose described.

In testimony whereof I affix my signature in presence of two witnesses.

EMIL NAUMANN.

Witnesses:
ALFRED M. WILSON,
H. E. SEIBERT.